US008224969B2

(12) United States Patent
Nampei

(10) Patent No.: US 8,224,969 B2
(45) Date of Patent: Jul. 17, 2012

(54) INFORMATION PROCESSOR

(75) Inventor: Kenichi Nampei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 11/359,327

(22) Filed: Feb. 22, 2006

(65) Prior Publication Data
US 2006/0195552 A1 Aug. 31, 2006

(30) Foreign Application Priority Data
Feb. 25, 2005 (JP) ................................. 2005-050965

(51) Int. Cl.
G06F 15/173 (2006.01)
G06F 15/16 (2006.01)

(52) U.S. Cl. .......................... 709/227; 709/218; 709/223

(58) Field of Classification Search .................. 709/227, 709/218, 223
See application file for complete search history.

(56) References Cited

U.S. PATENT DOCUMENTS

| 5,532,841 | A |   | 7/1996  | Nakajima et al.         |
|-----------|---|---|---------|-------------------------|
| 5,754,227 | A |   | 5/1998  | Fukuoka                 |
| 6,026,258 | A | * | 2/2000  | Fresk et al. ..... 399/87 |
| 6,321,266 | B1| * | 11/2001 | Yokomizo et al. ..... 709/226 |
| 6,490,052 | B1| * | 12/2002 | Yanagidaira ..... 358/1.15 |
| 6,553,431 | B1| * | 4/2003  | Yamamoto et al. ..... 710/8 |
| 6,590,673 | B2| * | 7/2003  | Kadowaki ..... 358/1.15  |
| 6,711,626 | B1| * | 3/2004  | Okada ..... 710/5        |
| 6,734,994 | B2|   | 5/2004  | Omori                   |
| 6,944,700 | B2| * | 9/2005  | Bateman et al. ..... 710/300 |
| 7,295,338 | B2| * | 11/2007 | Satake et al. ..... 358/1.15 |
| 2002/0052182 | A1 |   | 5/2002  | Mayuzumi |
| 2002/0090910 | A1 |   | 7/2002  | Takemura |
| 2003/0007170 | A1 | * | 1/2003  | Kajita et al. ..... 358/1.15 |
| 2003/0081237 | A1 |   | 5/2003  | Ogiwara et al. |
| 2003/0162556 | A1 | * | 8/2003  | Libes ..... 455/507 |
| 2004/0145774 | A1 | * | 7/2004  | Sesek et al. ..... 358/1.15 |
| 2004/0223057 | A1 |   | 11/2004 | Oura |
| 2004/0235469 | A1 | * | 11/2004 | Krug ..... 455/431 |
| 2004/0258006 | A1 |   | 12/2004 | An |
| 2005/0148326 | A1 | * | 7/2005  | Nogawa et al. ..... 455/420 |
| 2006/0015569 | A1 | * | 1/2006  | Rhodus et al. ..... 709/217 |
| 2006/0106918 | A1 | * | 5/2006  | Evert et al. ..... 709/220 |

FOREIGN PATENT DOCUMENTS

| CN | 1574762 A    | 2/2005  |
|----|--------------|---------|
| EP | 0975145 A2   | 1/2000  |
| JP | 11-134473 A  | 5/1999  |
| JP | 2002-202836 A| 7/2002  |
| JP | 2002-218167 A| 8/2002  |
| JP | 2004-200807 A| 7/2004  |

* cited by examiner

Primary Examiner — Mohamed Ibrahim
Assistant Examiner — Umar Cheema
(74) Attorney, Agent, or Firm — Canon USA Inc. IP Division

(57) ABSTRACT

In an information processor connected with an external apparatus by wireless to transmit and receive data, a connection with a plurality of external apparatuses can be easily changed. The information processor includes a wireless USB (WUSB) communication unit configured to connect to each of a plurality of external apparatuses by wireless to transmit and receive data to and from each external apparatus. A CPU acquires information about at least one external apparatus among a plurality of external apparatuses via the WUSB communication unit. The acquired information is displayed on a display unit before the communication is started to perform image processing between the information processor and one of a plurality of external apparatuses via the WUSB communication unit.

12 Claims, 5 Drawing Sheets

INFORMATION PROCESSOR

BACKGROUND OF THE INVENTION

1. Field of the Invention

The present invention relates to an information processor, a communication control method and a program. More particularly, the present invention relates to an information processor including a wireless USB communication unit configured to connect to a plurality of external apparatuses by wireless to transmit and receive data to and from each external apparatus, the communication control method utilized in the information processor, and the program for causing a computer to execute the communication control method.

2. Description of the Related Art

In a conventional image processor such as an image reading apparatus having a USB (Universal Serial Bus) interface, the image processor is connected with the external apparatus such as a PC (Personal Computer) by a USB cable, as discussed in Japanese Patent Application Laid-Open No. 2002-218167. In such a case, the image processor and the external apparatus communicate with each other in a one-to-one communication mode. Further, in a wire LAN (Local Area Network) or a wireless LAN, a one-to-multiple or multiple-to-multiple communication mode is already established, as discussed in Japanese Patent Application Laid-Open No. 11-134473 (1999) (corresponding to U.S. Pat. No. 6,734,994). In this case of an image reading apparatus connectable to the LAN, the read image can be transmitted to a plurality of external apparatuses.

Changing connection from one of a plurality of external apparatuses from an image reading apparatus to another of the plurality of external apparatuses requires complicated setting or operation.

Therefore, there is a need for a method of connecting to one of a plurality of external apparatuses from an image reading apparatus that can be easily changed without complicated setting or operation.

SUMMARY OF THE INVENTION

According to an aspect of the present invention there is provided a peripheral device for use in a wireless network system. The peripheral device includes a communication interface; and a control unit configured to control wireless communication between the peripheral device and the plurality of host devices and to indicate information relating to the availability of the plurality of host devices.

According to another aspect of the present invention there is provided an image capture system including a peripheral device (described above); a wireless network; and a plurality of host devices.

According to yet another aspect of the present invention there is provided a method of operating a peripheral device. The method includes connecting the peripheral device to a wireless network; searching for host devices on the wireless network; storing information relating to host devices found during the search, the information including information relating to availability; displaying information relating to the host devices found during the search; receiving user input to select a host device; establishing communication between the peripheral device and the selected host device; and sending data from the peripheral device to the host device.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

First Embodiment

Embodiments of the invention will be described in detail below with reference to the drawings.

Figure 1:
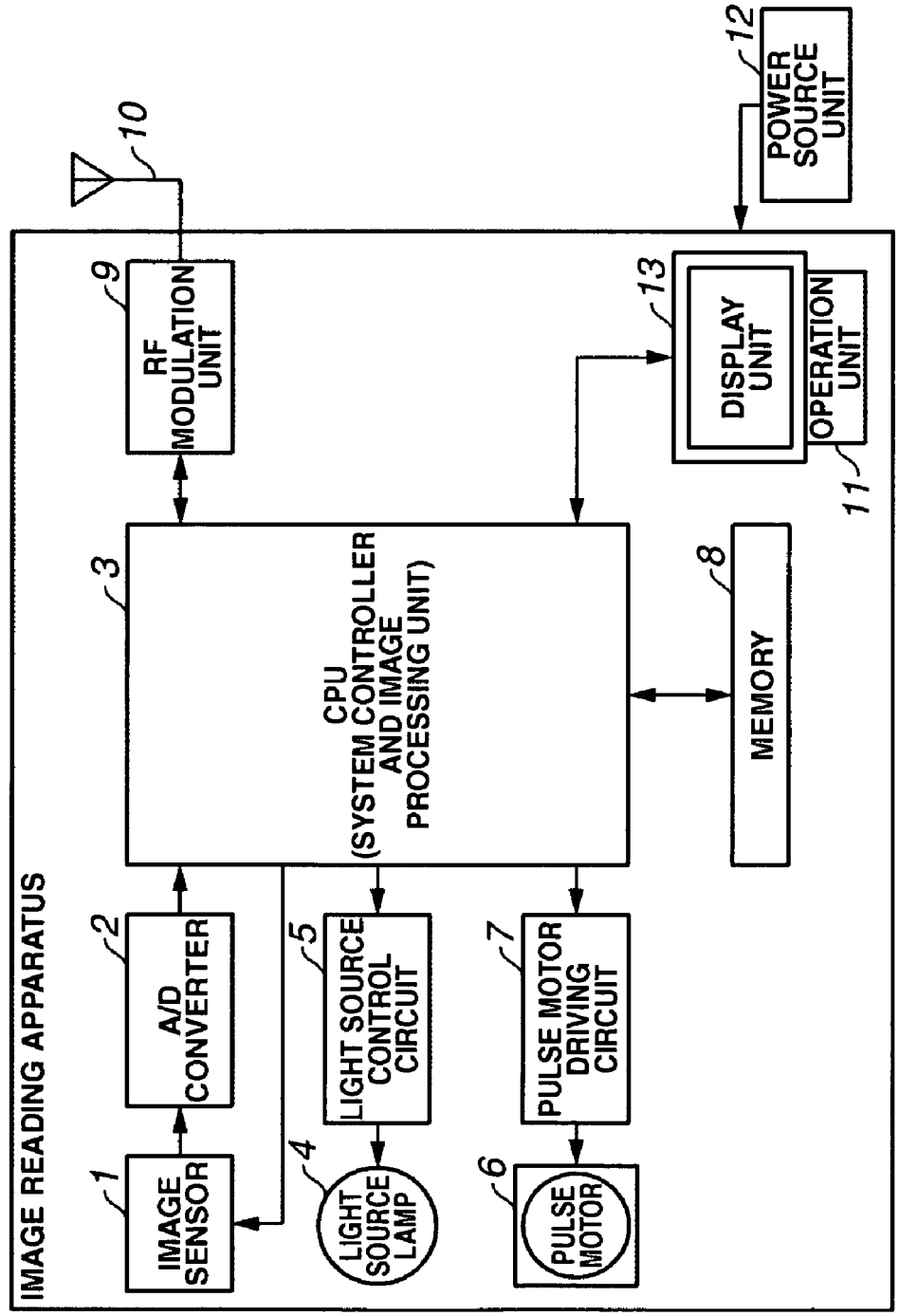
FIG. 1 is a block diagram illustrating an information processor according to a first embodiment of the present invention.

FIG. 1 is a block diagram illustrating a peripheral device (in the present example an information processor) according to a first embodiment of the present invention. In the drawing, an image reading apparatus is described as one example of an information processor.

The image reading apparatus according to the present exemplary embodiment includes a communication unit 10 configured to communicate by wireless between the image reading apparatus and a plurality of external apparatuses using a wireless USB (hereinafter, referred to as WUSB). In this case, a host apparatus including a personal computer (PC) serves as the external apparatus.

An RF (radio frequency) modulation unit 9 performs RF modulation of data to transmit and receive the data by wireless between the image reading apparatus and the external apparatus by the WUSB communication unit 10. A light source lamp 4 includes, for example, a cold cathode fluorescent lamp, and irradiates an original image which is to be read. A light source control circuit 5 includes an inverter circuit, which drives and lights the light source lamp 4 having the cold cathode fluorescent lamp.

The light source lamp 4 irradiates the original image. An image sensor 1 reads the original image which is to be read and converts it to an electrical signal to be output. An A/D (analog-to-digital) converter 2 converts an analog image signal, which is output from the image sensor 1, to a digital image signal. The CPU (central processing unit) 3 is configured to include a system controller and an image processing unit. The system controller stores an operation processing sequence of the entire image reading apparatus to perform various controls according to instructions from the external apparatus. The image processing unit performs image processing on the image signal digitalized by the A/D converter 2, for example, an offset correction, a shading correction, a gamma correction, a digital gain adjustment, or a definition conversion in main and sub scanning directions.

A pulse motor 6 is a drive source to move the scanning unit (not shown) along an original platen (not shown) to perform scanning. The scanning unit includes the image sensor 1 and the light source lamp 4, and is operated according to an excitation converting signal output from a pulse motor driving circuit 7. A memory 8 includes, for example, RAM (Random Access Memory), and is connected with the CPU 3 via a system bus (not shown) which includes an address bus and a data bus. The memory 8 is used as a working area when the image processing unit of the CPU 3 performs the image processing, and stores shading data for a shading correction or gamma data for gamma correction. Further, the memory 8 is used as a buffer memory when the image data is transmitted to the external apparatus via the WUSB communication unit 10. A display unit 13 performs display to confirm a setting content or an operating state of the image reading apparatus. An operation unit 11 is provided adjacent to the display unit 13. A power source unit 12 supplies electric power to each unit.

Figure 2:
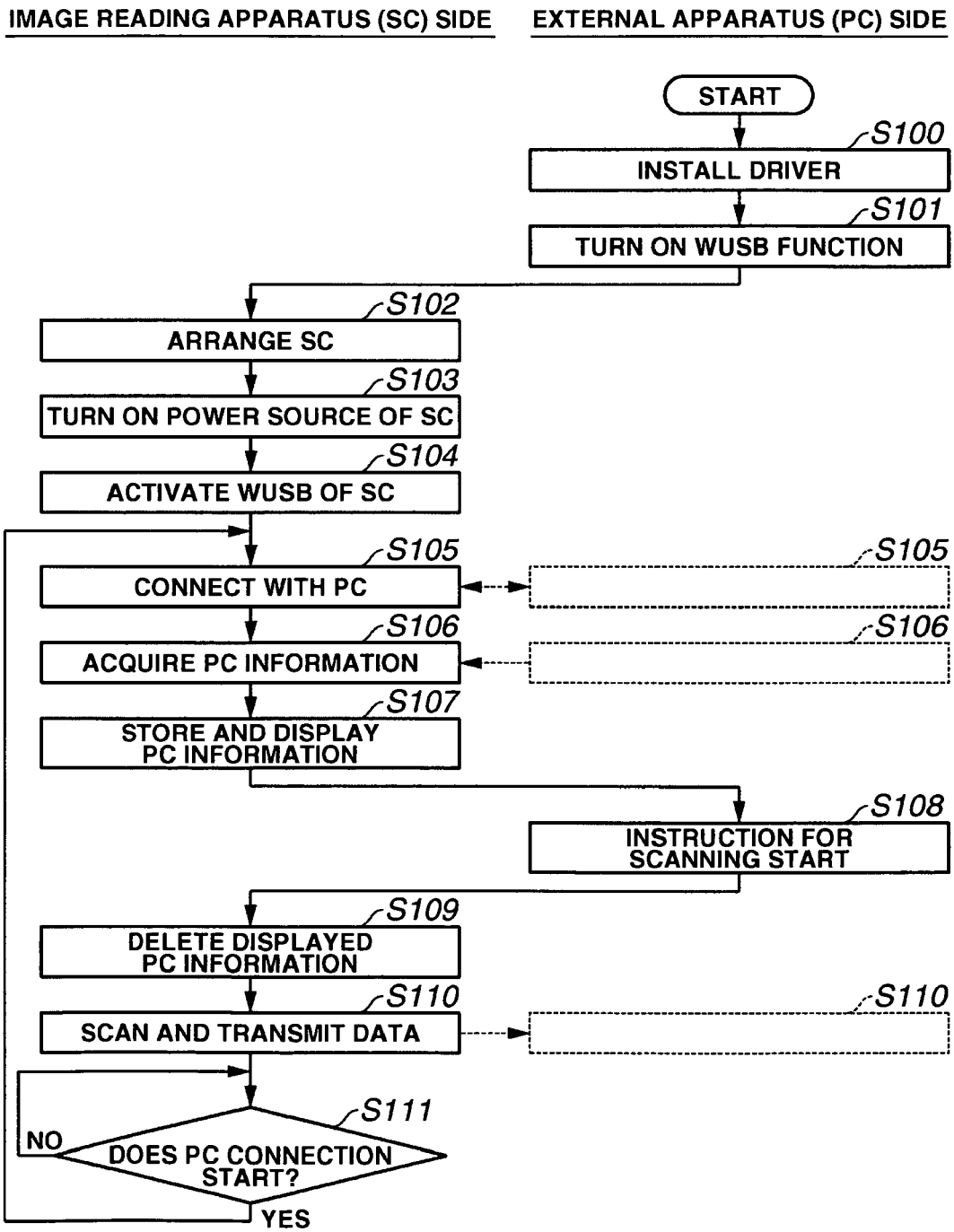
FIG. 2 is a flow chart illustrating steps of an image reading process, which are performed in an image reading apparatus and an external apparatus in the first embodiment.

FIG. 2 is a flow chart illustrating steps of an image reading process, which are performed in the image reading apparatus and the external apparatus in the first embodiment. The image reading apparatus is represented by SC, and the external apparatus by PC, in FIG. 2.

First, a user pre-installs a driver software program for controlling the image reading apparatus into each external apparatus (step S100). The external apparatus has a WUSB communication function and will be connected to the image reading apparatus. Then, the user sets the WUSB communication function of the external apparatus to be active (step S101). Then, the user arranges the image reading apparatus in FIG. 1 at a position that enables wireless-communicating with the external apparatus (step S102). The image reading apparatus has a WUSB communication unit 10.

Next, the user turns on a power source for the image reading apparatus (step S103), and activates the WUSB communication unit 10 of the image reading apparatus (step S104). At this time, the image reading apparatus issues a request to connect the WUSB to the PC. Thus, an enumeration processing (retrieving a device, initializing, and a sequence for environment setting) is performed for establishing communication in accordance with the WUSB specification (step S105). After finishing the enumeration processing, the CPU 3 of the image reading apparatus acquires the information of the external apparatus via the WUSB communication unit 10 (step S106).

Figure 3:
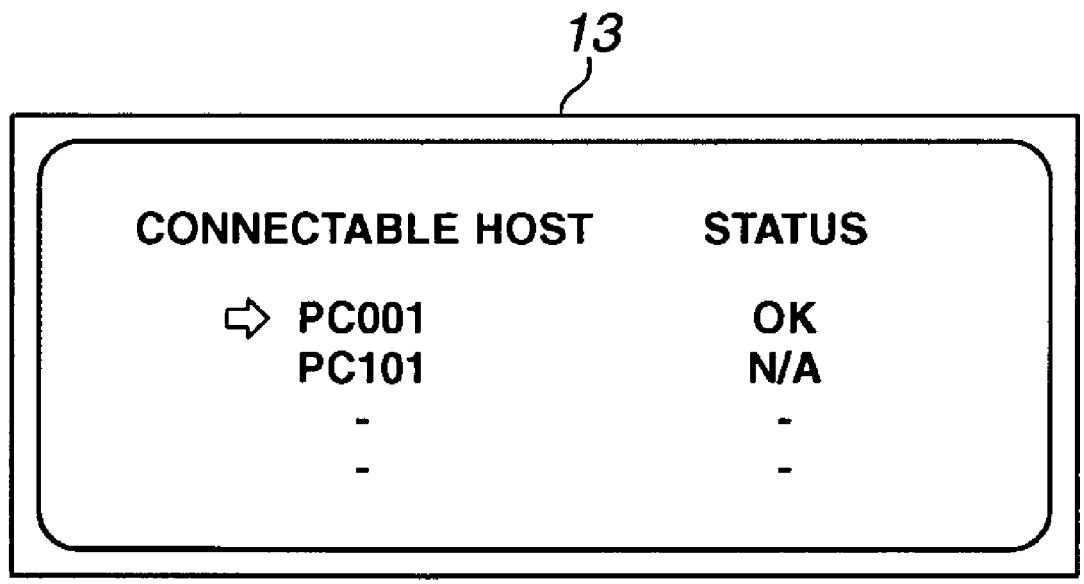
FIG. 3 is a diagram illustrating one example of information regarding a plurality of external apparatuses, which are displayed on a display unit of the image reading apparatus of the first embodiment.

The CPU 3 of the image reading apparatus stores the acquired information of the external apparatus in the memory 8 in the image reading apparatus and displays it on the display unit 13 in the image reading apparatus, together with other information of the external apparatus, which are already stored (step S107). FIG. 3 is a diagram illustrating one example of information about a plurality of external apparatuses displayed on the display unit 13 in the image reading apparatus. In FIG. 3, a name (a host name), a status or the like of the external apparatus that can connect to the image reading apparatus is displayed by the WUSB communication. For example, the "OK" is displayed as to the status of the external apparatus, in which the connection is established by the enumeration processing. Further, the external apparatus, in which the connection is not established now but can be connected, is listed and displayed. In this case, the "N/A" is displayed as to the status.

That is, the user is in an environment having a plurality of external apparatuses around one image reading apparatus. By performing the above display, the user operating the image reading apparatus can grasp the information relating to a plurality of external apparatuses around the image reading apparatus, and understand the external apparatus, in which the connection is now established by the enumeration processing.

Then, an instruction is given to the image reading apparatus to read (scan) an image by the user operating the external apparatus about which "OK" status is displayed among a plurality of external apparatuses on the display unit 13 (i.e., the external apparatus in which the connection is now established by the enumeration processing) (step S108, FIG. 2). Then, the CPU 13 of the image reading apparatus deletes the information relating to the external apparatus other than the external apparatus which is a destination of the read image data (step S109). Then, the image reading apparatus performs an image reading step while being controlled by driver software installed in the external apparatus. The image reading apparatus performs the image reading on the basis of setting of the external apparatus (which is the image data destination), and transmits the read image data to the external apparatus (step S110). After transmitting the data from the image reading apparatus to the external apparatus, the image reading apparatus is placed in an unconnected state by WUSB release processing performed from the external apparatus.

The CPU 3 of the image reading apparatus waits until connection to the external apparatus PC is started by an instruction of an user operating another external apparatus in which a driver software program for controlling the image reading apparatus is installed. When the connection is started ("YES" in step S111), the CPU 3 performs the enumeration processing between the image reading apparatus and the external apparatus to establish the connection (step S105). Then, the process proceeds to step S106.

In a case where the instruction to start scanning is not given in step S108 after the PC information is displayed in step 107, the process returns to step S105, and connection to the other external apparatus that can be connected is performed to display the PC information.

As described above, in the first embodiment, the WUSB communication environment where the image reading apparatus can be controlled is constructed by one of a plurality of external apparatuses. Accordingly, the connection to one of a plurality of external apparatuses from an image reading apparatus can be easily changed without complicated setting or operation.

Second Embodiment

A second embodiment of the present invention is now described.

Figure 4:
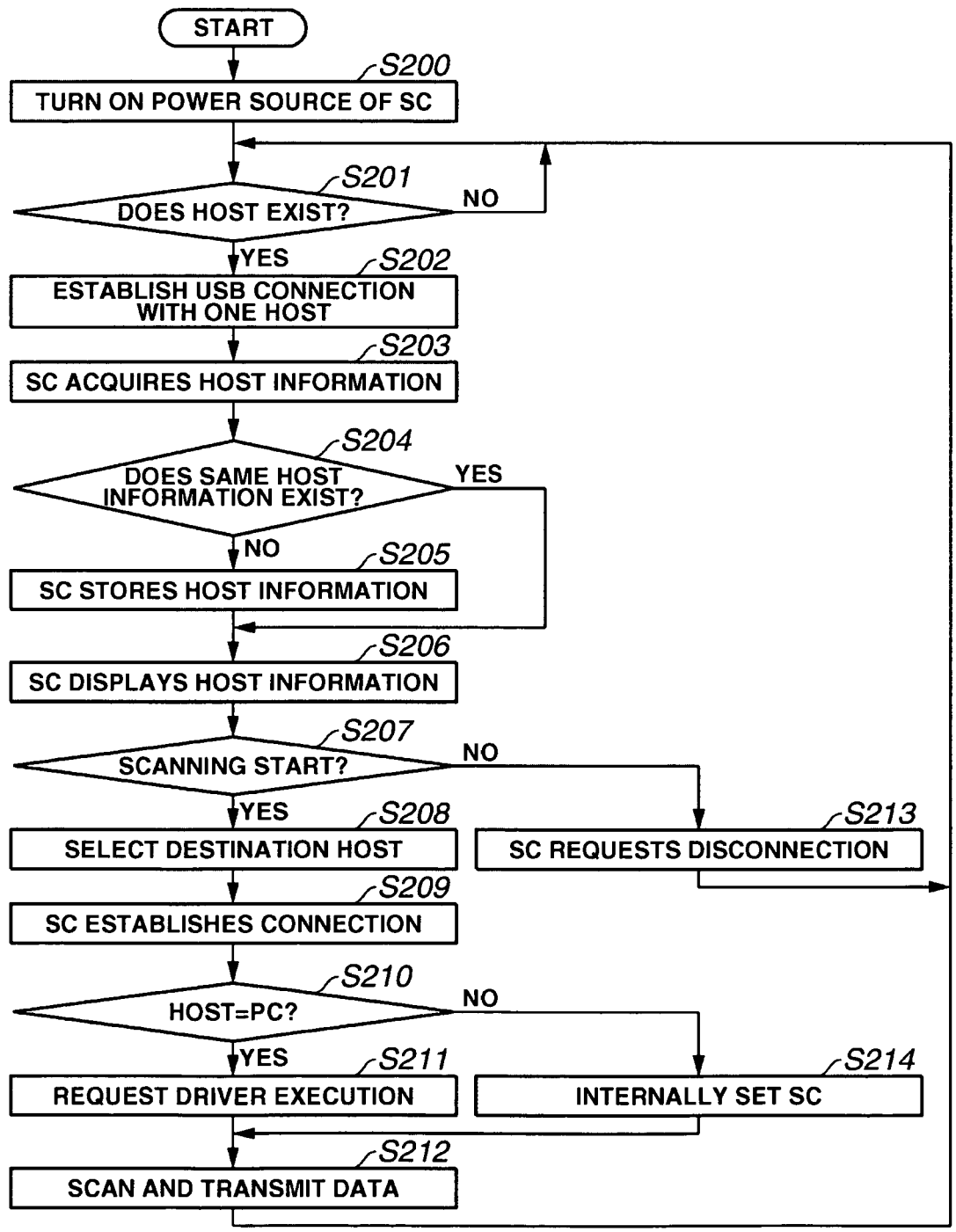
FIG. 4 is a flow chart illustrating steps of an image reading process, which are performed in an image reading apparatus and an external apparatus in a second embodiment.

FIG. 4 is a flow chart illustrating steps of an image reading process, which are performed in an image reading apparatus and an external apparatus according to a second embodiment. The image reading apparatus is represented by "SC", and the external apparatus by "HOST", in FIG. 4.

First, a user turns on the power source of the image reading apparatus including the WUSB communication unit 10 so that the image reading apparatus becomes operable (step S200). A plurality of external apparatuses having the WUSB communication function that enables communicating with the image reading apparatus are arranged around the image reading apparatus (within a range available for communication by the WUSB communication unit 10). The WUSB communication functions of a plurality of external apparatuses are set to be active. The SC detects a signal of the WUSB and determines whether the HOST exists. The SC waits until the signal of the WUSB is detected if the HOST does not exist (step S201). If the HOST exists, the SC establishes the WUSB connection to one HOST existing in a plurality of HOSTS (step S202).

After finishing the enumeration processing with the connected HOST, the CPU 3 of the image reading apparatus acquires information (hereinafter, referred to as the "HOST information") of the external apparatus which was subjected to the enumeration processing via the WUSB communication unit 10 (step S203). Then, the CPU 3 of the image reading apparatus determines whether the same information as the HOST information acquired in step S203 exists among the HOST information acquired before step S203 and already stored in the memory 8 in the image reading apparatus (step S204). If the CPU 3 determines that the same information exists, the process proceeds to step S206.

Figure 5:
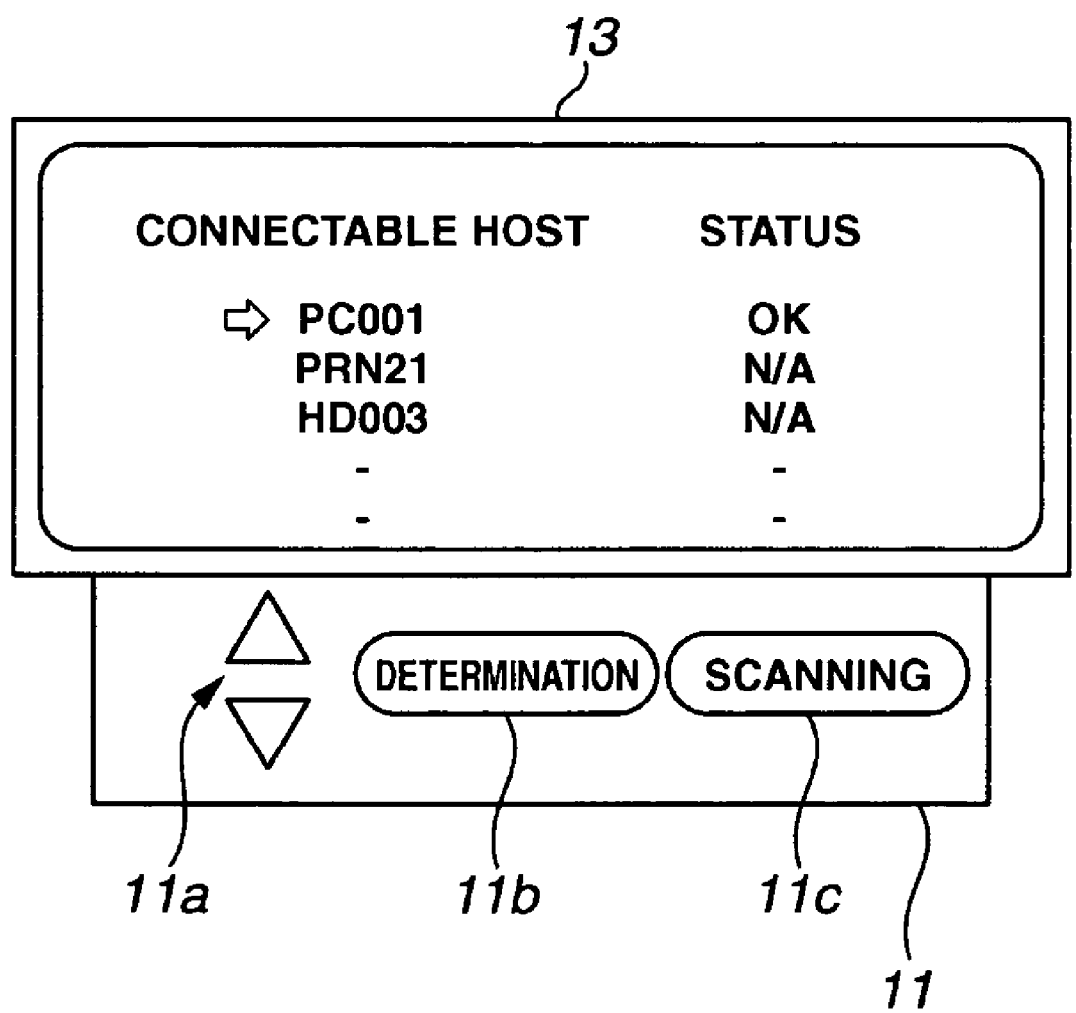
FIG. 5 is a diagram illustrating a display unit and an operation unit in the second embodiment.

On the other hand, if the CPU 3 determines that the same information as the HOST information acquired in step S203 does not exist among the HOST information stored in the memory 8 in the image reading apparatus, the process proceeds to step S205. In step S205, the CPU 3 of the image reading apparatus stores the HOST information acquired in step S203 in the memory 8. Then, all HOST information stored in the memory 8 is displayed on the display unit 13 in step S206. On the display unit 13, a plurality of external apparatuses that can communicate with the image reading apparatus are displayed as illustrated in FIG. 5. In the example shown in FIG. 5, statuses for a personal computer PC001, a printer PRN21, and a storage device HD003 are displayed.

Then, the CPU 3 of the image reading apparatus determines whether a scan button 11c in an operation unit 11 in the image reading apparatus has been operated by the user, that is, whether a request to start the image reading (scanning) is issued (step S207). If the CPU 3 determines that the request to start the scanning has not been issued, the process proceeds to step S213. Then, the CPU 3 sends a request to disconnect the WUSB connection to the external apparatus about which the HOST information is acquired in step 203. Then, the process returns to step S201.

On the other hand, if the CPU 3 determines that a request to start the image reading is issued in step S207, the process proceeds to step S208. In step S208, the external apparatus which is the destination of the image data is selected from a plurality of external apparatuses capable of performing connection. A plurality of external apparatuses are displayed on the display unit 13, as illustrated in FIG. 5. The user moves an arrow cursor by operating an UP/DOWN button 11a of the operation unit 11, and can scroll the display when the external apparatuses exist in a number more than displayable lines. When the cursor is pointed on the external apparatus to be selected, the user operates a decision button 11b to select the external apparatus. When the CPU 3 of the image reading apparatus receives instruction information indicating the external apparatus which is the destination of the selected image data, the CPU 3 establishes the WUSB connection to the external apparatus. When the same PC as the one connected in the last step S202 is selected, the process continues to proceed as it is. When a different PC is selected, the CPU 3 reestablishes the WUSB connection to the PC (step S209). Then, the CPU 3 determines whether the external apparatus selected in step S208 is a PC in which driver software for controlling the image reading apparatus is already installed (step S210). If the CPU 3 of the image reading apparatus determines that the external apparatus selected in step S208 is the PC having the driver software, the CPU 3 controls the WUSB communication unit 10 and transmits a request to execute the driver software to the PC (step S211). The PC that receives this request executes the driver software installed in the PC on the basis of the setting of the PC. Thus, the image reading apparatus executes the image reading while being controlled by the software, and transmits the read image data to the PC (step S212). On the other hand, if the CPU determines that the external apparatus selected in step S208 is a printer or storage device (that can be the PC), which does not have the driver software for controlling the image reading apparatus, the process proceeds to step S214. In step S214, the CPU 3 of the image reading apparatus executes the image reading independently, and forms the read image data according to a preset format. Then, the CPU 3 transmits the image data in the preset format to the external apparatus selected in step 208 (step S212).

When transmission of the image data is finished (step S212), the CPU 3 of the image reading apparatus disconnects the WUSB connection to the external apparatus and enters an idle state. Then, the process returns to step S201 and transfers to the processing for detecting a new external apparatus. This processing is repeated continuously. When a plurality of HOSTs exists, it is preferred to give priority connection to the HOST which is not stored in the memory 8, in step 202.

As described above, also in the second embodiment, the WUSB communication environment is constructed such that one image reading apparatus can be shared with a plurality of external apparatuses. Accordingly, the connection to one of a plurality of external apparatuses from an image reading apparatus can be easily changed without complicated setting or operation. Particularly, such an easy change of the connection is possible when the external apparatus is a printer or a storage device which does not have the driver software for controlling the image reading apparatus.

In the second embodiment, the HOST information is acquired by changing the HOST among a plurality of existing HOSTs one after another to establish the connection. However, the HOST information can be displayed without establishing the connection by specifying the Host from an ID of the HOST included in the signal of the WUSB. As for the ID of the HOST, it is preferred that a corresponding table of the description, which can be easily understood by a user, is prepared beforehand and displayed on the display unit 13. Further, in the second embodiment, after it is determined whether a request to start the scanning has been issued (step S207), the destination HOST is selected (step S208). However, the destination HOST may be selected before step S207.

Further Embodiments

In the first and second embodiments, an image reading apparatus such as a scanner was described as one example of the information processor. However, the present invention can be applied also to a general information processor, camera, or other peripheral device.

Program code (software) executing functions of each embodiment may be recorded in a storage medium. The storage medium is supplied to a system or an apparatus, and a computer (or CPU, micro-processing unit (MPU) or the like) in the system or the apparatus reads and executes the program code stored in the storage medium.

In this case, the program code read from the storage medium and/or stored in storage means 8, is executed by CPU 3, which executes the functions of each embodiment.

Further, as the storage medium for supplying the program code, for example, a floppy disc, a hard disc, a magneto-optical disc, a CD-ROM (compact disc-ROM), a CD-R (CD-recordable), a CD-RW (CD-rewritable), a DVD-ROM (digital versatile disc-ROM), a DVD-RAM, a DVD-RW, a DVD+

RW, a magnetic tape, a nonvolatile memory card, or a ROM can be used. Furthermore, program code can be downloaded via a network.

Further, the present invention includes the case where, when the computer executes the read program code, not only the functions of each embodiment are executed, but also an OS (Operating System) or the like working on the computer, performs a part or all the actual processing of the program code on the basis of the instructions of the program, and the functions of each embodiment are executed.

Further, the present invention includes the case where, after the program code read from the storage medium is written into a memory in a function extension board installed into the computer, or a function extension unit connected with the computer, a CPU or the like in the function extension board or the function extension unit performs a part or all of the actual processing, and the functions of each embodiment are executed.

In this case, the program is supplied by directly downloading from the storage medium that records the program, or downloading from the other computer, a data base or the like (not shown), which are connectable to the Internet, a commercial network or a local area network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-050965 filed Feb. 25, 2005, which is hereby incorporated by reference herein in its entirety.

What is claimed is:

1. A peripheral device for use in a wireless bus system of one host device among a plurality of host devices, the peripheral device comprising:
   means for capturing an image;
   a wireless communication interface configured to connect the peripheral device to one bus system of one host device, the one bus system made up of only the one host device and at least one peripheral device;
   a display;
   a user interface;
   a storage device configured to store information relating to each host device; and
   a control unit,
      wherein the control unit is configured to:
      i) control the wireless communication interface between the peripheral device and each of the plurality of host devices to automatically perform enumeration and determine which host devices are available to construct the bus system with the peripheral device, and store information of the determined host devices in the storage device if it is not stored in the storage device,
      ii) indicate information relating to the availability of the plurality of host devices on the display,
      iii) select one of the host devices with the user interface,
      iv) capture an image with the means for capturing controlled by a device driver software installed in the selected host device,
      v) send the captured image to the selected host device using the wireless communication interface,
      vi) disconnecting the selected host device and the peripheral device after the captured image is sent to the selected host, and
      vii) continually performing enumeration and determining which host devices are available to construct the bus system with the peripheral device, wherein priority to perform enumeration is given to a host device whose information is not stored in the storage device.

2. A peripheral device as claimed in claim 1, wherein the control unit is configured to control transmission and/or reception of data between the peripheral device and a selected host device.

3. A peripheral device as claimed in claim 1, further comprising means for identifying the presence of a newly available host device on the wireless network.

4. A peripheral device as claimed in claim 1, further comprising means for formatting data for transmission to a given host device in a predetermined way.

5. A peripheral device as claimed in claim 1 in which the means for capturing an image comprises a camera.

6. A peripheral device as claimed in claim 1 in which the means for capturing an image comprises a scanner.

7. A peripheral device as claimed in claim 1, wherein the plurality of host devices includes at least one personal computer.

8. A peripheral device as claimed in claim 1, wherein the plurality of host devices includes at least one printer.

9. An image capture system comprising:
   a peripheral device as claimed in claim 1;
   a wireless network; and
   a plurality of host devices.

10. An image capture system as claimed in claim 9, wherein the plurality of host devices includes at least one personal computer.

11. An image capture system as claimed in claim 9, wherein the plurality of host devices includes at least one printer.

12. A method of operating a peripheral device including a display, a wireless communication interface, a user interface, and a control unit, for use in a wireless bus system of one host device among a plurality of host devices, the method comprising:
   connecting the peripheral device to a wireless network;
   searching for host devices on the wireless network;
   automatically performing enumeration and determining which host devices are available to construct the bus system with the peripheral device, and storing information of the determined host devices in a storage device if it is not stored in the storage device;
   storing information relating to bus systems of host devices found during the search, the information including information relating to availability;
   displaying information relating to the host devices found during the search on the display, wherein the peripheral device enables a user to select one bus system of the plurality of host devices that are available to construct the bus system with the peripheral device, the one bus system including only the one host device and at least one peripheral device;
   receiving user input from the user interface to select a host device;
   selecting one of the host devices with the user interface;
   capturing an image with means for capturing controlled by a device driver software installed in the selected host device;
   establishing communication between the peripheral device and the selected host device;
   sending image data from the peripheral device to the host device using the wireless communication interface;

disconnecting the selected host device and the peripheral device after the captured image is sent to the selected host; and continually performing enumeration and determining which host devices are available to construct the bus system with the peripheral device, wherein priority to perform enumeration is given to a host device whose information is not stored in the storage device.

* * * * *